(12) United States Patent
Larsen

(10) Patent No.: US 8,458,955 B2
(45) Date of Patent: Jun. 11, 2013

(54) SEED AND PLANT GROWTH MEDIUM MODULE

(76) Inventor: David Larsen, Hines Creek (CA)

( * ) Notice: Subject to any disclaimer, the term of this patent is extended or adjusted under 35 U.S.C. 154(b) by 374 days.

(21) Appl. No.: 12/996,615

(22) PCT Filed: Oct. 30, 2009

(86) PCT No.: PCT/CA2009/001554
§ 371 (c)(1),
(2), (4) Date: Dec. 6, 2010

(87) PCT Pub. No.: WO2010/048717
PCT Pub. Date: May 6, 2010

(65) Prior Publication Data
US 2011/0162270 A1 Jul. 7, 2011

(30) Foreign Application Priority Data

Oct. 31, 2008 (CA) .................................. 2643563

(51) Int. Cl.
*A01G 9/02* (2006.01)
(52) U.S. Cl.
USPC .................................. 47/65.5; 47/65.7; 47/79
(58) Field of Classification Search
USPC ................ 47/65.7, 74, 77, 79, 80, 1.01 T
See application file for complete search history.

(56) References Cited

U.S. PATENT DOCUMENTS

| | | | | |
|---|---|---|---|---|
| 3,005,287 A * | 10/1961 | Dudley | | 47/21.1 |
| 3,047,981 A * | 8/1962 | Shupe et al. | | 47/41.12 |
| 3,375,607 A * | 4/1968 | Odd | | 47/74 |
| 3,555,730 A * | 1/1971 | Brink | | 47/57.6 |
| 3,561,159 A * | 2/1971 | Adams | | 47/57.6 |
| 3,616,573 A * | 11/1971 | Clifford | | 47/57.6 |
| 3,690,034 A * | 9/1972 | Knapp | | 47/57.6 |
| 4,251,951 A * | 2/1981 | Heinstedt | | 47/39 |
| 4,299,056 A * | 11/1981 | Towning | | 47/81 |
| 4,628,633 A * | 12/1986 | Nilsson | | 47/57.6 |
| 5,181,951 A * | 1/1993 | Cosse, Jr. | | 71/64.11 |
| 5,250,082 A * | 10/1993 | Teng et al. | | 47/57.6 |
| 6,219,968 B1 * | 4/2001 | Belger et al. | | 47/74 |
| 6,606,821 B1 * | 8/2003 | Connelly | | 47/48.5 |
| 6,782,656 B2 * | 8/2004 | Washburn | | 47/29.2 |
| 7,131,234 B2 * | 11/2006 | Carlson et al. | | 47/57.6 |
| 2005/0102895 A1 * | 5/2005 | Bissonnette et al. | | 47/57.6 |
| 2009/0013598 A1 * | 1/2009 | Mileto | | 47/48.5 |
| 2010/0263274 A1 * | 10/2010 | Corak et al. | | 47/57.6 |
| 2011/0162270 A1 * | 7/2011 | Larsen | | 47/65.7 |

FOREIGN PATENT DOCUMENTS

| | | | |
|---|---|---|---|
| CA | 1076804 A1 * | 5/1980 | |
| CA | 109807 A1 * | 2/1981 | |
| CA | 1161640 A1 * | 2/1984 | |
| CA | 1195118 A1 * | 10/1985 | |

(Continued)

*Primary Examiner* — Frank T Palo
(74) *Attorney, Agent, or Firm* — Christensen O'Connor Johnson Kindness PLLC

(57) ABSTRACT

A seed and plant growth medium module includes a seed embedded in plant growth medium which is encapsulated in a biodegradable moisture retaining shell. The shell has a bottom with an upper covering. A root opening is provided in the bottom to allow egress of roots as the seed germinates. A plant egress opening is provided in the upper covering to allow upward growth of a plant resulting when the seed germinates. At least one water entry opening is provided in the shell to allow entry of moisture into the shell to wet the plant growth medium.

19 Claims, 2 Drawing Sheets

FOREIGN PATENT DOCUMENTS

| | | | |
|---|---|---|---|
| CN | 200976770 Y | * | 11/2007 |
| FR | 2693079 A1 | * | 1/1994 |
| WO | WO 8503192 A1 | * | 8/1985 |
| WO | WO 2005041641 A1 | * | 5/2005 |

* cited by examiner

SEED AND PLANT GROWTH MEDIUM MODULE

FIELD

The present invention relates to a seed and plant growth medium module that is used in reforestation and land reclamation.

BACKGROUND

In reforestation and land reclamation some modest success has been attained by placing a seed into plant growth medium to form a seed and plant growth medium module. It has been determined that whether the seed in the module germinates is entirely dependent upon the moisture received during germination.

SUMMARY

There is provided a seed and plant growth medium module comprising a seed embedded in plant growth medium which is encapsulated in a biodegradable moisture retaining shell. The shell has a bottom with an upper covering. A root opening is provided in the bottom to allow egress of roots as the seed germinates. A plant egress opening is provided in the upper covering to allow upward growth of a plant resulting when the seed germinates. At least one water entry opening is provided in the upper covering of the shell to allow entry of moisture into the shell to wet the plant growth medium.

According to an aspect, there is provided a seed and plant a seed and plant growth medium module, comprising a seed embedded in plant growth medium which is encapsulated in a biodegradable polymer plastic moisture retaining shell. The shell has a bottom with an upper covering. A root opening is provided in the bottom to allow egress of roots as the seed germinates. A plant egress opening is provided in the upper covering to allow upward growth of a plant resulting when the seed germinates. The shell is in the form of a disk with a rain collection gutter positioned around a circumference of the disk and at least one water entry opening is provided to allow moisture collected in the rain collection gutter to pass into the shell to wet the plant growth medium.

According to an aspect, there is provided a method of preparing a seed for planting, comprising the steps of: embedding a seed within plant growth medium; wetting the plant growth medium; and freezing the plant growth medium to retain moisture during transport.

According to an aspect, there is provided a seed and plant growth medium module, comprising a seed embedded in plant growth medium which is encapsulated in a biodegradable moisture retaining shell. The shell has a bottom with an upper covering, a root opening being provided in the bottom to allow egress of roots as the seed germinates, and a plant egress opening being provided in the upper covering to allow upward growth of a plant resulting when the seed germinates. Frozen moisture is contained within the plant growth medium.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

Figure 1:
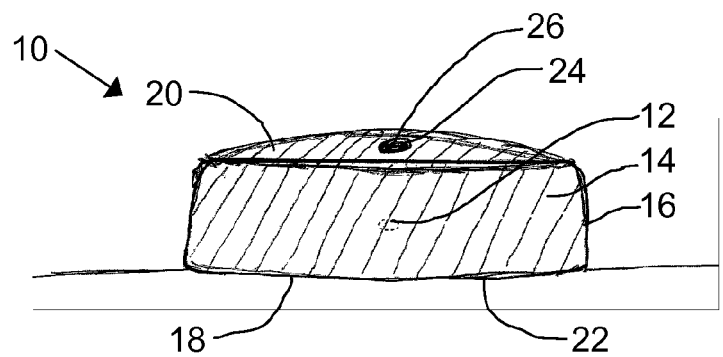
FIG. 1 is a side elevation view of a seed and plant growth medium module.

A seed and plant growth medium module generally identified by reference numeral 10 will now be described with reference to FIG. 1 through 6.

Structure and Relationship of Parts:

Referring to FIG. 1, seed and plant growth medium module 10 includes a seed 12 embedded in plant growth medium 14 which is encapsulated in a biodegradable moisture retaining shell 16, such as a shell made from biodegradable polymer plastic, or plasticized paper. Shell 16 has a bottom 18 shown in FIG. 2 and an upper covering 20 shown in FIG. 3. Plant growth medium 14 may be compressed, and preferably contains substances that are known in the art to enhance plant growth.

Figure 2:
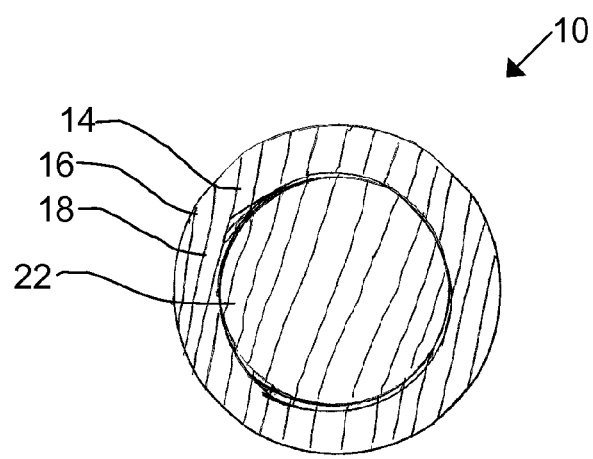
FIG. 2 is a bottom plan view of the seed and plant growth medium module.
Figure 3:
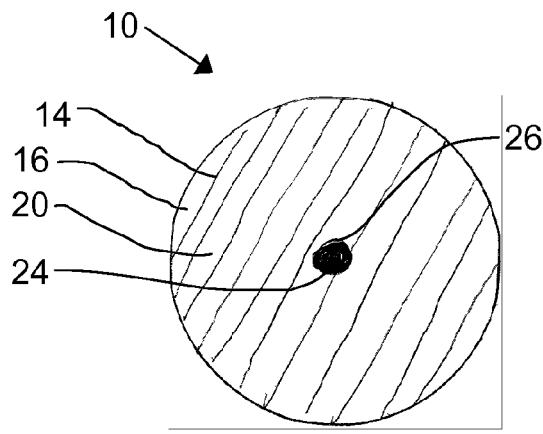
FIG. 3 is a top plan view of the seed and plant growth medium module.

Referring to FIG. 2, a root opening 22 is provided in bottom 18 to allow egress of roots as seed 12 germinates. Referring to FIG. 3, a plant egress opening 24 is provided in upper covering 20 to allow upward growth of a plant resulting from the germination of seed 12. One or more water entry openings 26 are provided in shell 16 to allow entry of moisture into shell 16 to wet plant growth medium 14. As shown in FIG. 3, water entry opening 26 may be the same as plan egress opening. It will be understood that the number of water entry openings may be varied to be one or more, depending on the preference of the user. Alternatively, water entry openings 26 may be provided by using a porous or perforated material (not shown).

Figure 4:
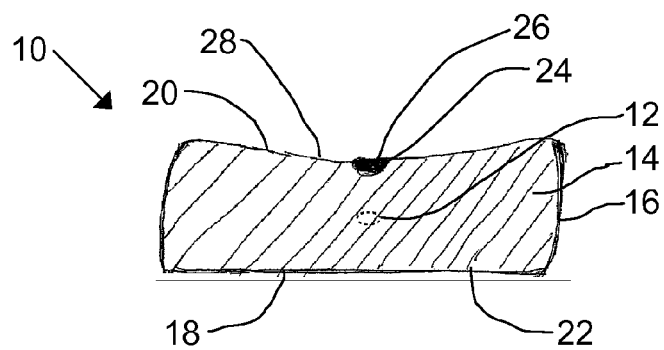
FIG. 4 through 6 are variations of the seed and plant growth medium module.
Figure 5:
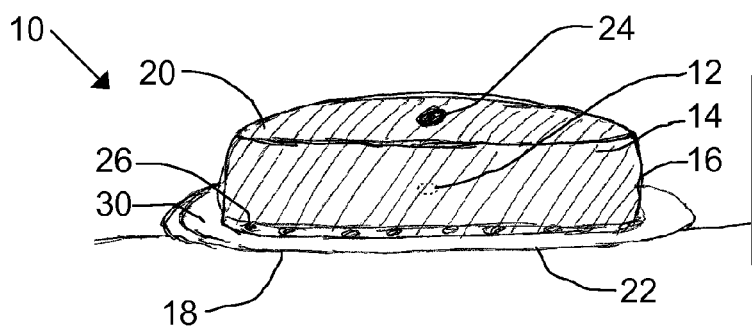
Figure 6:
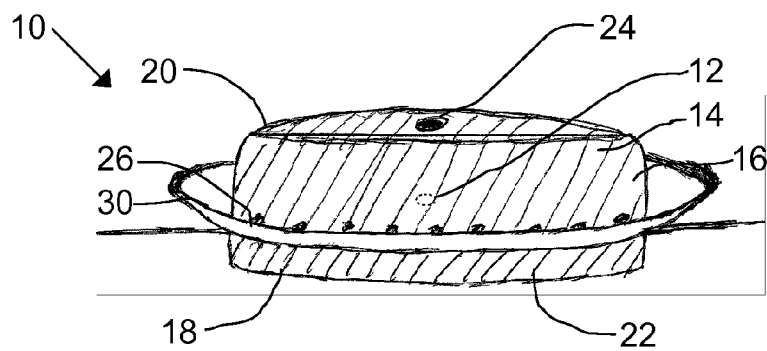

Referring to FIG. 4, upper covering 20 may have a concave depression 28 with water entry openings 26 positioned in concave depression 28. In this embodiment, water entry opening 26 is again the same as plant egress opening 24, although other openings 26 may also be provided. There may also be more than one concave depression 28 with corresponding water entry openings 26, depending on the preference of the user. Referring to FIGS. 5 and 6, shell 16 may have a peripheral rain collection gutter 30 with water entry openings 26 extending from peripheral rain collection gutter 30 through a defining wall 32 of shell 16. In FIG. 5, peripheral rain collection gutter 30 is positioned around bottom 18 of shell 16, and in FIG. 6, peripheral rain collection gutter 30 is spaced upwardly from bottom 18 of shell 16.

The embodiments depicted are shown to be generally "disk" shaped, some of which have a rain collection gutter 30 positioned around a circumference of the disk. However, it will be understood that the actual shape may vary depending on the preferences of the user and depending on the circumstances of the intended us. Considerations that may be taken into account when designing the shape of shell 16 may include stability on the ground, volume to surface area ratio, material costs, water collection or drainage, distance from seed to top and bottom, etc.

Operation:

Referring to FIG. 1, seed and plant growth medium module 10 are provided by embedding seed 12 in plant growth medium 14, which may be compressed. Compressed plant growth medium 14 with seed 12 may then wetted and frozen to ensure there is sufficient water for the seed to germinate once the module 10 has been distributed. Optionally, modules 10 may be distributed in a dry condition. In general, modules 10 are wetted when there is a concern about whether there will be sufficient water to allow the seed to germinate. However, when there will be sufficient water in the environment, it may be unnecessary to wet the modules. Preferably, compressed plant growth medium with seed 12 is at least partially enclosed in a shell 16. Shell 16 may take various forms. Modules 10 are then placed where a tree is desired, such as in reforestation efforts, etc. with bottom 18 facing down. Moisture that may be gathered by depression 28 as shown in FIG. 4 or gutter 30 as shown in FIG. 5 or 6 is transferred inside shell 16 through water entry openings 26. As seed 12 germinates, roots egress out of shell 16 via root opening 22, and the resulting plant extends out of egress opening 24. Shell 16 is preferably sufficiently durable such that it remains intact long enough to retain moisture and increase the chance of survival of the resulting plant, while being biodegradable such that it breaks down after this has occurred to avoid any environmental damage. It has been found that modules that have been frozen retain their moisture during transportation and handling longer than modules that have not been frozen.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The following claims are to be understood to include what is specifically illustrated and described above, what is conceptually equivalent, and what can be obviously substituted. Those skilled in the art will appreciate that various adaptations and modifications of the described embodiments can be configured without departing from the scope of the claims. The illustrated embodiments have been set forth only as examples and should not be taken as limiting the invention. It is to be understood that, within the scope of the following claims, the invention may be practiced other than as specifically illustrated and described.

What is claimed is:

1. A seed and plant growth medium module, comprising:
    a seed embedded in plant growth medium which is encapsulated in a biodegradable moisture retaining shell, the shell having a bottom with an upper covering, a root opening being provided in the bottom to allow egress of roots as the seed germinates, a plant egress opening being provided in the upper covering to allow upward growth of a plant resulting when the seed germinates, at least one water entry opening being provided in the upper covering of the shell to allow entry of moisture into the shell to wet the plant growth medium; and
    the upper covering having at least one concave depression with the at least one water entry opening positioned in the at least one concave depression.

2. The seed and plant growth medium module of claim 1, wherein the upper covering of the shell comprises a defining wall extending from the bottom of the shell, the shell having a peripheral rain collection gutter with the at least one water entry extending from the peripheral rain collection gutter through a defining wall of the shell.

3. The seed and plant growth medium module of claim 2, wherein the peripheral rain collection gutter is positioned around the bottom of the shell and the at least one water entry is positioned in the defining wall adjacent to the bottom.

4. The seed and plant growth medium module of claim 2, wherein the peripheral rain collection gutter is spaced upwardly from the bottom of the shell.

5. The seed and plant growth medium module of claim 2, wherein the shell is in the form of a disk and the rain collection gutter is positioned around a circumference of the disk.

6. The seed and plant growth medium module of claim 1, wherein the shell is made of polymer plastic.

7. The seed and plant growth medium module of claim 1, wherein the plant growth medium is compressed.

8. A seed and plant growth medium module, comprising:
    a seed embedded in plant growth medium which is encapsulated in a biodegradable polymer plastic moisture retaining shell, the shell having a bottom with an upper covering, a root opening being provided in the bottom to allow egress of roots as the seed germinates, a plant egress opening being provided in the upper covering to allow upward growth of a plant resulting when the seed germinates, the shell being in the form of a disk with a rain collection gutter positioned around a circumference of the disk and at least one water entry opening being provided to allow moisture collected in the rain collection gutter to pass into the shell to wet the plant growth medium; and
    the upper covering having at least one concave depression with the at least one water entry opening positioned in the at least one concave depression.

9. The seed and plant growth medium module of claim 8, wherein the peripheral rain collection gutter is positioned around the bottom of the shell.

10. The seed and plant growth medium module of claim 8, wherein the peripheral rain collection gutter is spaced upwardly from the bottom of the shell.

11. The seed and plant growth medium module of claim 8, wherein the plant growth medium is compressed.

12. A method of preparing a seed for planting, comprising the steps of:
    embedding a seed within plant growth medium which is encapsulated in a biodegradable moisture retaining shell, the shell having a bottom with an upper covering, a root opening being provided in the bottom to allow egress of roots as the seed germinates, a plant egress opening being provided in the upper covering to allow upward growth of a plant resulting when the seed germinates, at least one water entry opening being provided in the upper covering of the shell to allow entry of moisture into the shell to wet the plant growth medium, the upper covering having at least one concave depression with the at least one water entry opening positioned in the at least one concave depression;
    wetting the plant growth medium; and
    freezing the plant growth medium to retain moisture during transport.

13. A seed and plant growth medium module, comprising:
    a seed embedded in plant growth medium which is encapsulated in a biodegradable moisture retaining shell, the shell having a bottom with an upper covering, a root opening being provided in the bottom to allow egress of roots as the seed germinates, and a plant egress opening being provided in the upper covering to allow upward growth of a plant resulting when the seed germinates, the upper covering having at least one concave depression with the at least one water entry opening positioned in the at least one concave depression; and frozen moisture contained within the plant growth medium.

14. The seed and plant growth medium module of claim 13, wherein the shell has a peripheral rain collection gutter with the at least one water entry extending from the peripheral rain collection gutter through a defining wall of the shell.

15. The seed and plant growth medium module of claim 14, wherein the peripheral rain collection gutter is positioned around the bottom of the shell and the at least one water entry is positioned in the defining wall adjacent to the bottom.

16. The seed and plant growth medium module of claim 14, wherein the peripheral rain collection gutter is spaced upwardly from the bottom of the shell.

17. The seed and plant growth medium module of claim 14, wherein the shell is in the form of a disk and the rain collection gutter is positioned around a circumference of the disk.

18. The seed and plant growth medium module of claim 13, wherein the shell is made of polymer plastic.

19. The seed and plant growth medium module of claim 13, wherein the plant growth medium is compressed.

* * * * *